Figure 1:
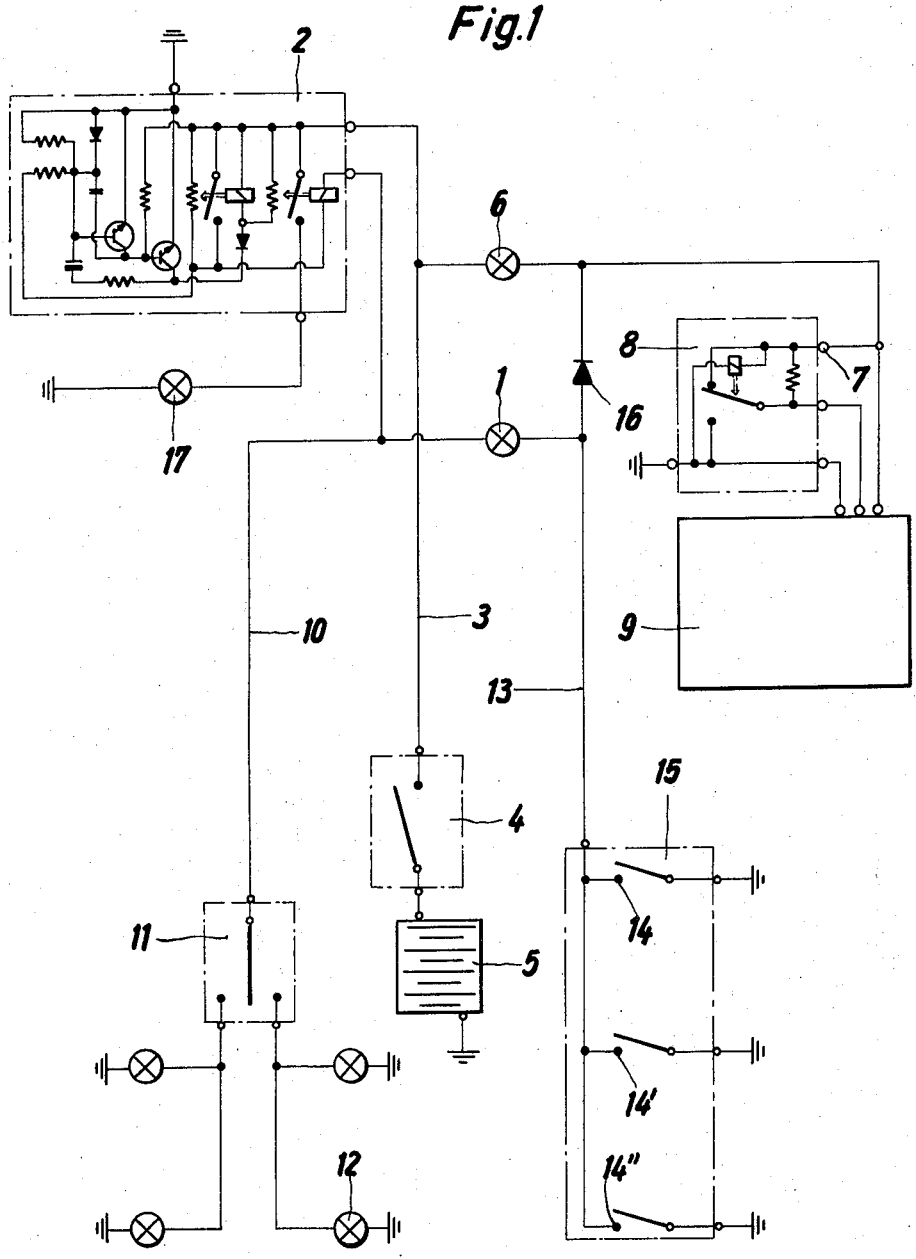

United States Patent
Bensel et al.

[11] 3,810,086
[45] May 7, 1974

[54] ELECTRICAL CONTROL CIRCUIT FOR A CENTRAL WARNING LIGHT OF MOTOR VEHICLES

[75] Inventors: Walter Bemsel, Stuttgart-Bad Cannstatt; Hermann Schreiner, Schwieberdingen, both of Germany

[73] Assignee: Dr.-Ing. h.c.F. Porsche KG, Stuttgart-Zuffenhansen, Germany

[22] Filed: Sept. 7, 1971

[21] Appl. No.: 178,309

[30] Foreign Application Priority Data
Sept. 8, 1970 Germany............................ 2044383

[52] U.S. Cl..................... 340/52 F, 340/69, 340/75, 340/81 R, 340/251
[51] Int. Cl.......................... B60q 1/38, G08b 19/00
[58] Field of Search ......... 340/52 R, 52 F, 73, 81 R

[56] References Cited
UNITED STATES PATENTS

| | | |
|---|---|---|
| 2,511,631 | 6/1950 | Gordon...................... 340/52 F UX |
| 3,566,401 | 2/1971 | Smith et al...................... 340/75 UX |
| 2,571,360 | 10/1951 | Hallerberg.......................... 340/52 F |
| 3,597,729 | 8/1971 | Lopez................................ 340/52 F |
| 3,641,488 | 2/1972 | Mullin............................... 340/52 F |

FOREIGN PATENTS OR APPLICATIONS
662,098   4/1963   Canada............................. 340/52 F

*Primary Examiner*—John W. Caldwell
*Assistant Examiner*—Kenneth N. Leimer
*Attorney, Agent, or Firm*—Craig and Antonelli

[57] ABSTRACT

An electrical control circuit for testing the operativeness of a central warning light which serves for indicating the operating condition of one or several electrical monitoring devices for a vehicle which is equipped with an intermittently operable, so-called flasher direction-indicator transmitter whereby the warning light is connected in the circuit between the direction-indicator transmitter and the regulator of a light generator and is controlled by a voltage-dependent element.

7 Claims, 2 Drawing Figures

ELECTRICAL CONTROL CIRCUIT FOR A CENTRAL WARNING LIGHT OF MOTOR VEHICLES

The present invention relates to an electrical control circuit for a central warning light which serves for the indication of the functioning of one or several electrical check or monitoring installations for a vehicle which is equipped with a flasher or blinker-type direction-indicator transmitter.

The object of the present invention is an electrical control circuit for checking the operability of warning lights in vehicles.

An electrical control circuit for warning lights of motor vehicles is already known in the prior art (DAS, Deutsch Auslegeschrift, 1, 936, 190). In this construction, the warning lights are forcibly turned on for a short period of time and then turned off again during the starting of the operation of the vehicle. This takes place in a switch position of the ignition lock, which lies between the "on" and the "off" position of the ignition key. However, this construction entails the disadvantage that the switch position of the ignition lock may be rapidly passed over unconsciously, when turning on the ignition of the internal combustion engine, so that the functioning indication of the warning lights lights up only within a very short period of time and thus is hardly noticeable. By such a construction, a clear control of the operability of the warning lights does not exist whereby under certain circumstances, for example, in case of a damaged lamp or light body of the warning lights, a checking or monitoring installation connected to the warning light can no longer be watched by the driver. In a further embodiment of this construction, a bimetallic switch is arranged between the ignition lock and the warning light. When turning on the ignition of the internal combustion engine, the warning light is turned on over a predetermined period of time depending on the construction of the bimetallic switch. This construction eliminates a part of the shortcomings of the first embodiment, however, due to the constant lighting up of the warning light in conjunction with the usual indicating lights which become visible when turning on the ignition of a motor vehicle, there exists in connection therewith the danger of getting used thereto so that the driver in the course of time no longer notices the functioning indication of the warning light.

In contradistinction thereto, the present invention is concerned with the task to provide an electric control installation for monitoring the functioning of warning lights which is characterized by a simple construction, by a reliable operation, as well as by an optically noticeable indication, and which can be installed with simple means also subsequently into a vehicle.

The aim of the present invention is solved in that the warning light is connected in the circuit between the intermittently operable direction-indicator transmitter of the vehicle and the regulator of the generator or alternator, to be referred to hereinafter as light generator for the sake of convenience, and is controlled by a voltage-dependent element. Advantageously, the voltage-dependent element is constituted by a diode which is connected in the circuit between the warning lights and the regulator. A further advantageous arrangement resides in that a relay is connected into the circuit between the flasher direction indicator transmitter and the regulator of the light generator, which is controlled by the regulator of the light generator.

The advantages attained with the present invention consist especially in that by the arrangement of a diode or of a relay in the line between the warning light connected with the blinker direction indicator transmitter and the regulator of the light generator, a simple circuit is obtained in which the warning light lights up during the functioning control as well as during the indication of a defect of one of the warning systems connected to the warning light at the blinking rythm of the direction-indicator transmitter of the vehicle. An optically well-noticeable indication is achieved thereby which always attracts the attention of the driver by the blinker rhythm. Furthermore, an operating or functioning control of the warning light is obtained by the characterized construction which becomes forcibly effective when turning on the ignition and which, after the starting of the engine, remains advantageously effective up to the cut-in rotational speed of the light generator and which is turned off automatically by the regulator thereof.

Figure 2:
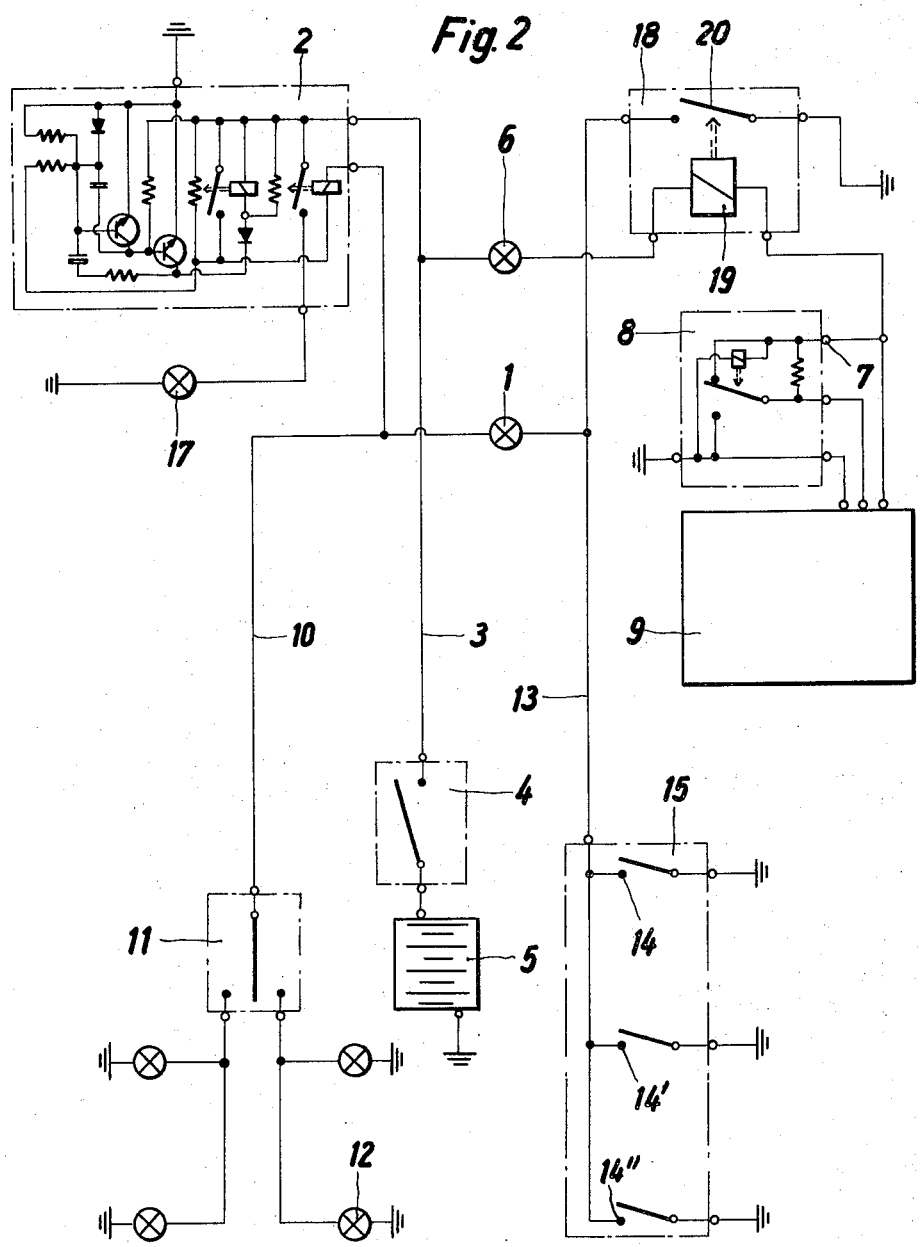

These and other objects, features and advantages of the present invention will become more apparent from the following description when taken in connection with the accompanying drawing which shows, for purposes of illustration only, two embodiments in accordance with the present invention, and wherein:

FIG. 1 is a schematic diagram of an electrical control circuit according to the present invention for a motor vehicle to monitor the functioning of a warning light controlled by a diode; and FIG. 2 is a schematic circuit diagram of a further embodiment of an electrical control circuit for a vehicle in which a relay is used for the control of the warning light.

Referring now to the drawing, and more particularly to FIG. 1, the electrical control circuit illlustrated in this figure for a warning light 1 essentially consists of a conventional blinking direction-indicator transmitter 2 of the intermittently operable or flashing type which can be connected with the positive terminal of a battery 5 of a vehicle by means of an ignition line 3 and by way of an ignition lock 4. The ignition line 3 is further connected by way of a charge control light 6 with the output terminal 7 of a regulator 8 of a conventional generator or alternator 9, to be referred to hereinafter for the sake of simplicity as a light generator. The warning light 1 is connected to the blinker pulse line 10 of the turn indicator transmitter 2 which can be connected by way of a turn indicator switch 11 with the individual direction indicator lights 12 of the vehicle. A further line 13 is connected to warning contacts 14, 14' and 14'' of a monitoring or checking installation 15, checking the release position of the hand brake, the brake pressure as well as the brake fluid condition, and leads from the monitoring installation 15 to the warning light 1 and by way of a diode 16 to the output terminal 7 of the regulator 8. A blinker control light 17 is further connected to the intermittently operable direction-indicator transmitter 2, which is turned on during the operation of the direction-indicator transmitter 2.

The embodiment illustrated in FIG. 2 of a control circuit for a warning light has essentially the same circuit arrangement as the embodiment of FIG. 1 so that the same parts are designated by the same reference numerals. In the embodiment of FIG. 2, however, a relay 18 is provided in lieu of the diode 16. The relay 18 is thereby connected with its magnetic winding 19 in the connecting line from the charge control light 6 to the output terminal 7 of the regulator 8. The switching contacts 20 of the relay 18 are connected with the line 13 of the warning contacts 14, 14', 14" of the monitoring installation 15.

At first, the operation of the electric control circuit according to FIG. 1 will be described. When turning on the ignition by the ignition lock 4, current flows from the battery 5 by way of the ignition line 3 to the blinking direction-indicator transmitter 2 as well as by way of the charge control light 6 to the output terminal 7 of the regulator 8 of the light generator 9. Simultaneously, current flows by way of the blinker pulse line 10 to the warning light 1 and from there by way of the diode 16 to the regulator 8. Since the output terminal 7 of the regulator 8 is connected to the negative terminal of the battery 5 when the internal combustion engine of the vehicle stands still, the charge control light 6 as well as the warning light 1 and the blinker control light 17 light up whereby the warning light 1 and the blinker control light 17 light up by way of the blinker pulse line 10 in the blinking rhythm of the blinking direction-indicator transmitter 2. The functioning of the light body of the warning light 1 is thereby indicated to the driver. After the starting of the internal combustion engine, current is produced by the light generator 9 during idling of the internal combustion engine when reaching the cut-in rotational speed. As a result thereof, the output terminal 7 is disconnected from the negative terminal of the battery 5 by the shifting contact (not shown) of the regulator 8 and the current produced by the light generator 9 now flows by way of the output terminal 7 to the charge control light 6 so that the charge control light 6 is connected in effect across the same voltage terminals and extinguishes as a result thereof. Simultaneously, the line 13 is blocked by the diode 16 so that the warning light 1 is disconnected from the negative terminal of the battery 5 and extinguishes as a result thereof.

The operation of the electric control circuit illustrated in FIG. 2 is analogously the same, only with this circuit arrangement the magnetic coil 19 of the relay 18 is energized by way of the ignition line 3 when the ignition is turned on whereby the contacts 20 close. As a result thereof, the warning light 1 is connected with the negative terminal of the battery 5 so that the warning light 1 is caused to light intermittently up, i.e., to flash by the blinking direction-indicator transmitter 2 by way of the blinker pulse line 10. During the idling of the internal combustion engine, similar as in the control circuit illustrated in FIG. 1, the magnetic coil 19 of the relay 18 is connected in effect across the same voltage terminals by the current produced by the light generator 9 so that the contacts 20 of the relay 18 open whereby the warning light 1 is disconnected from the negative terminal of the battery 5 and extinguishes as a result thereof.

If one of the warning contacts 14, 14', 14" of the monitoring installation 15 is closed as a result of a defect, then the warning light 1 in both embodiments is connected with the negative terminal of the battery 5 by way of the warning contacts 14, 14', 14" as long as the ignition remains turned on, so that the lamp 1 is caused to intermittently light up, i.e., to flash, and more particularly for such length of time until the defect is eliminated.

The present invention is not limited to the illustrate embodiments. Thus, in lieu of the warning lights, also an acoustic signal transmitter may be provided. Similarly, it is within the scope of the present invention to combine a warning light with an acoustic signal transmitter so that an acoustic and an optical warning and operating indication is obtained. Furthermore, in lieu of the direction-indicator transmitter also an additional flasher relay may be used.

Consequently, we do not wish to be limited to the details shown and described herein but intend to cover all such changes and modifications as are encompassed by the scope of the appended claims.

We claim:

1. An electric control circuit for testing during the starting up of a vehicle engine the functioning of a central warning light serving for indicating the operating condition of at least one electrical monitoring device for the vehicle comprising power source means, ignition switch means connected to said power source means, flasher-type direction-indicator transmitter means connected to said ignition switch means and providing a pulsating output signal, vehicle direction indicator signalling means connected to the output of said direction-indicator transmitter means, generator-regulator unit means providing an output signal in accordance with the operation of the vehicle engine, said warning light having a first terminal connected to the output of said direction-indicator transmitter means, a diode connected to a second terminal of said warning light and to said generator-regulator unit means for controlling the energization of said warning light in the test condition during the starting up of the vehicle engine, and at least one electrical monitoring device connected to the second terminal of said warning light, said diode initially permitting energization of said warning light in accordance with the pulsating output signal of said direction-indicator transmitter means and being responsive to a predetermined output signal of said generator-regulator unit means corresponding to a predetermined engine speed for preventing an energizing circuit path for said warning light therethrough and de-energizing said warning light in the test condition, whereby said warning light may be energized in response to the operation of the at least one monitoring device connected thereto providing an energizing circuit path for said warning light.

2. An electric control circuit according to claim 1, wherein said diode has an anode connected to the second terminal of said warning light and a cathode connected to said generator-regulator unit means.

3. An electric control circuit according to claim 1, further comprising a charge control light having a first terminal connected to said ignition switch means and a second terminal connected to a cathode of said diode and to said generator-regulator unit means.

4. An electric control circuit according to claim 3, wherein said generator-regulator unit means includes a regulator and a generator, said regulator connected to said generator, and the cathode of said diode being connected to said regulator.

5. An electric control circuit for testing during the starting up of a vehicle engine the functioning of a central warning light serving for indicating the operating condition of at least one electrical monitoring device for the vehicle comprising power source means, ignition switch means connected to said power source means, flasher-type direction indicator transmitter means connected to said ignition switch means and providing a pulsating output signal, vehicle direction indicator signalling means connected to the output of said direction-indicator transmitter means, generator-regulator unit means providing an output signal in accordance with the operation of the vehicle engine, said warning light having a first terminal connected to the output of said direction-indicator transmitter means, relay means connected to a second terminal of said warning light and to said generator-regulator unit means for controlling the energization of said warning light in the test condition during the starting up of the vehicle engine, and at least one electrical monitoring device connected to the second terminal of said warning light, said relay means initially permitting energization of said warning light in accordance with the pulsating output signal of said direction-indicator transmitter means and being responsive to a predetermined output signal of said generator-regulator unit means corresponding to a predetermined engine speed for preventing an energizing circuit path for said warning light therethrough, and de-energizing said warning light in the test condition, whereby said warning light may be energized in response to the operation of at least one monitoring device connected thereto providing an energizing circuit path for said warning light.

6. An electric control circuit according to claim 5, wherein said relay means includes a magnetic coil means connected in the electrical circuit between said ignition switch means and said generator-regulator unit means and a switching contact operated by said magnetic coil means connected to the second terminal of said warning light to provide an energizing circuit path for said warning light in the closed condition thereof.

7. An electric control circuit according to claim 6, further comprising a charge control light having a first terminal connected to said ignition switch means and a second terminal connected to said magnetic coil means of said relay means.

* * * * *